United States Patent
Narvinger et al.

(10) Patent No.: US 6,868,075 B1
(45) Date of Patent: Mar. 15, 2005

(54) METHOD AND APPARATUS FOR COMPRESSED MODE COMMUNICATIONS OVER A RADIO INTERFACE

(75) Inventors: Per Narvinger, Stockholm (SE); Fredrik Ovesjo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/511,242

(22) Filed: Feb. 23, 2000

Related U.S. Application Data
(60) Provisional application No. 60/156,431, filed on Sep. 28, 1999.

(51) Int. Cl.$^7$ .............................................. H04B 7/216
(52) U.S. Cl. ...................... 370/335; 370/320; 370/331; 370/342; 370/441; 370/479; 375/130; 455/422; 455/522
(58) Field of Search ................................. 370/320, 331, 370/335, 342, 441, 479; 375/130, 146, 149; 455/422, 436, 439, 522

(56) References Cited

U.S. PATENT DOCUMENTS

| | | | |
|---|---|---|---|
| 5,533,014 A | 7/1996 | Willars et al. ................. 370/18 |
| 5,845,211 A | * 12/1998 | Roach, Jr. .................... 455/436 |
| 5,883,899 A | 3/1999 | Dahlman et al. ........... 370/468 |
| 5,896,368 A | 4/1999 | Dahlman et al. ........... 370/335 |
| 5,991,330 A | 11/1999 | Dahlman et al. ........... 375/200 |
| 6,009,091 A | 12/1999 | Stewart et al. .............. 370/342 |
| 6,339,646 B1 | * 1/2002 | Dahlman et al. ........... 380/273 |
| 6,549,785 B1 | * 4/2003 | Agin ........................... 370/335 |
| 2003/0031143 A1 | * 2/2003 | Faerber ....................... 370/331 |

OTHER PUBLICATIONS

3GPP TS25.212 V2.2.0 "Multiplexing and channel codeing" (Sep., 1999).*
"3GPP 3G TS 25.212 V3.1.0 (1999–21)" Technical Specification.
"3GPP TS 25.212 V2.2.0 (1999–09)" Technical Specification Change History.
"3GPP TS 25.212 V2.2.0 (1999–09)" Technical Specification.
"3GPP TS 25.215 V0.10.01 (1999–09)" Technical Specification.
"3GPP 3G TS 25.211 V3.1.0 (1999–12)" Technical Specification.

* cited by examiner

Primary Examiner—Dang Ton
Assistant Examiner—Shick Hom
(74) Attorney, Agent, or Firm—Nixon & Vanderhye P.C.

(57) ABSTRACT

A system and corresponding method for utilizing Code Division Multiple Access (CDMA) techniques in compressed modes. In certain embodiments, radio frames on an uplink data channel are formed and transmitted to include at least one transmission gap (TG) therein in a compressed mode. This may be achieved by reducing the spreading factor (e.g., by a factor of two). In combination with reducing the spreading factor, the TG may be tailored or adjusted to its desired length (TGL) by using bit repetition (or reduction of puncturing). This enables the TG length to be tailored to a desired length, without having to increase output power more than necessary. In other embodiments of this invention, frames on an uplink control channel are formed or formatted so as to repeat format indicator (e.g., TFCI) bits therein in compressed mode. Optionally, format indicator bit(s) immediately or directly following the TG may be repeated later in the frame since these bits may sometimes suffer from slightly worse power control than other TFCI bits in the frame. Moreover, any embodiment of this invention is also applicable to downlink channel communications.

8 Claims, 12 Drawing Sheets

Frame structure in uplink compressed transmission (a) Frame structure type A (d) Frame structure type B Frame structure types in downlink compressed transmission

Fig. 12

Table 2: DPCCH fields

| Slot Format #i | Channel Bit Rate (kbps) | Channel Symbol Rate (ksps) | SF | Bits/ Frame | Bits/ Slot | $N_{pil}$ | $N_{TP}$ | $N_{TF}$ | $N_{FB}$ | Transmitted slots per radio frame |
|---|---|---|---|---|---|---|---|---|---|---|
| 0 | 15 | 15 | 256 | 150 | 10 | 6 | 2 | 2 | 0 | 15 |
| 0A | 15 | 15 | 256 | 150 | 10 | 5 | 2 | 3 | 0 | 10-14 |
| 0B | 15 | 15 | 256 | 150 | 10 | 4 | 2 | 4 | 0 | 8-9 |
| 1 | 15 | 15 | 256 | 150 | 10 | 8 | 2 | 0 | 0 | 8-15 |
| 2 | 15 | 15 | 256 | 150 | 10 | 5 | 2 | 2 | 1 | 15 |
| 2A | 15 | 15 | 256 | 150 | 10 | 4 | 2 | 3 | 1 | 10-14 |
| 2B | 15 | 15 | 256 | 150 | 10 | 3 | 2 | 4 | 1 | 8-9 |
| 3 | 15 | 15 | 256 | 150 | 10 | 7 | 2 | 0 | 1 | 8-15 |
| 4 | 15 | 15 | 256 | 150 | 10 | 6 | 2 | 0 | 2 | 8-15 |
| 5 | 15 | 15 | 256 | 150 | 10 | 5 | 1 | 2 | 2 | 15 |
| 5A | 15 | 15 | 256 | 150 | 10 | 4 | 1 | 3 | 2 | 10-14 |
| 5B | 15 | 15 | 256 | 150 | 10 | 3 | 1 | 4 | 2 | 8-9 |

Table 3: Parameters for different TGLs in compressed mode

| TGL | Type | Adjustable /fixed gap position | Spreading Factor | Idle length[ms] | Transmission time Reduction method | Idle frame Combining |
|---|---|---|---|---|---|---|
| 3 | A | Adjustable Or Fixed | 512 – 4 | 1.73-1.99 | Puncturing Spreading factor reduction by 2 Higher layer scheduling | (S) (D) =(1,2),(2,1) |
|  | B |  | 256- 4 | 1.60-1.86 |  |  |
| 4 | A |  | 512 - 4 | 2.40-2.66 |  | (S) (D) =(1,3),(2,2),(3,1) |
|  | B |  | 256- 4 | 2.27-2.53 |  |  |
| 7 | A |  | 512 - 4 | 4.40-4.66 |  | (S) (D)=(1,6),(2,5),(3,4),(4,3),(5,2),(6,1) |
|  | B |  | 256- 4 | 4.27-4.53 |  |  |
| 10 | A |  | 512 - 4 | 6.40-6.66 |  | (D)=(3,7),(4,6),(5,5),(6,4),(7,3) |
|  | B |  | 256- 4 | 6.27-6.53 |  |  |
| 14 | A | Fixed | 512 - 4 | 9.07-9.33 |  | (D) =(7,7) |
|  | B |  | 256- 4 | 8.93-9.19 |  |  |

Fig. 13(a)

Table 3: Parameters for different TGLs in compressed mode

| TGL | Type | Adjustable /fixed gap position | Spreading Factor | Idle length[ms] | Transmission time Reduction method | Idle frame Combining |
|---|---|---|---|---|---|---|
| 3 | A | Adjustable Or Fixed | 512 – 4 | 1.73-1.99 | Puncturing Spreading factor reduction by 2 Higher layer scheduling | (S) (D) =(1,2),(2,1) |
|  | B |  | 256- 4 | 1.60-1.86 |  |  |
| 4 | A |  | 512 - 4 | 2.40-2.66 |  | (S) (D) =(1,3),(2,2),(3,1) |
|  | B |  | 256- 4 | 2.27-2.53 |  |  |
| 7 | A |  | 512 -4 | 4.40-4.66 |  | (S) (D)=(1,6),(2,5),(3,4),(4,3),(5,2),(6,1) |
|  | B |  | 256- 4 | 4.27-4.53 |  |  |
| 10 | A |  | 512 - 4 | 6.40-6.66 |  | (D)=(3,7),(4,6),(5,5),(6,4),(7,3) |
|  | B |  | 256- 4 | 6.27-6.53 |  |  |
| 14 | A | Fixed | 512 - 4 | 9.07-9.33 |  | (D) =(7,7) |
|  | B |  | 256- 4 | 8.93-9.19 |  |  |

*Fig. 13(b)*

Spreading for uplink DPCCH and DPDCHs

Uplink modulation.

Transport channel multiplexing structure for downlink

Spreading for all downlink physical channels except SCH

Spreading and modulation for SCH and P-CCPCH

METHOD AND APPARATUS FOR COMPRESSED MODE COMMUNICATIONS OVER A RADIO INTERFACE

This application claims on U.S. priority on U.S. Provisional Patent Application Ser. No. 60/156,431, filed Sep. 28, 1999, the entire disclosure of which (including all attachment thereto) is hereby incorporated herein by reference. Additionally, this application is related to commonly-owned U.S. Pat. Nos. 5,533,014, 5,883,899, and 5,896,368, and U.S. application Ser. No. 09/185,395 filed Nov. 3, 1998 (now U.S. Pat. No. 6,339,646), all of which are hereby incorporated herein by reference in their entireties.

This invention relates to the use of spread spectrum, e.g., Code Division Multiple Access (CDMA), techniques in cellular radio communications systems. More particularly, this invention relates to a method and apparatus/system in which a compressed mode may be utilized in an uplink and/or downlink between a mobile station and a base station(s) in such a system.

BACKGROUND AND SUMMARY OF THE INVENTION

As illustrated in FIG. 1(a), cellular communications networks typically include plural base stations (BS) 101 through which mobile connections 102 are established over the air interface with respective mobile stations (MS) 103. Base stations 101 may be connected through landline(s) to a radio network controller 105, which in turn may be connected by landline(s) to a mobile switching center (MSC) 107 or other switching node. MSC 107 is usually connected, e.g., via a gateway, to other telecommunication networks such as the public switched telephone network (PSTN).

Extension terminals (ET) 109 of the RNC are used to form ATM (Asynchronous Transfer Mode) connections over landlines or links 111 to: base stations 101. Each base station 101 may include, for example, a base station controller 113, a slave timing unit 115 to provide synchronization, and an ATM switching unit 117, and each RNC may include a master timing unit 119, a diversity handover unit 121, and an ATM switch 117 as is known in the art.

In the past, communications between a MS and a BS in such networks have been achieved using Frequency Division Multiple Access (FDMA) and/or Time Division Multiple Access (TDMA) methods. In FDMA, a communication channel is a single radio frequency band into which a signal's transmission power is concentrated. Interference with adjacent channels is limited via band pass filters which pass substantial signal only within the specified frequency band. Because each channel is assigned a different frequency band, FDMA system capacity is limited by the number of available frequencies as well as by limitations imposed by frequency reuse. In TDMA systems not employing frequency hopping, a channel may consist of a time slot in a periodic train of time intervals over; the same frequency band. A signal's energy is confined to a time slot. In FDMA and TDMA systems, it is not desirable to have two potentially interfering signals occupying the same frequency at the same time. In contrast, CDMA is an access technique which uses spread spectrum modulation to allow signals to overlap in both frequency and time.

Each BS defines a "cell" within which communications may be conducted between the BS and a plurality of different MS units (e.g., cell phones, pagers, etc.) located within the cell. Adjacent cells may often overlap with one another. "Uplink" communications are from a MS to a BS; while "downlink" communications are from a BS to a MS. Different types of cells may operate at different frequencies, even in CDMA type systems. Because MS units tend to move from one cell to another on a relatively frequent basis as MS users travel around, handover procedures must be supported between different cells, and thus between different frequencies, so that MS units which move between cells may have continued support within the network.

There are several conventional techniques for determining which new frequency and/or cell should be selected among plural handover candidates. In certain instances, MS units may aid in the determination of the best handover candidate (and associated new base station). Such aiding may involve the MS periodically or on demand making measurements on each of several candidate frequencies to help determine a best handover candidate based upon some criteria (e.g., strongest RSSI, best BER, etc.).

There exists therefore a need for MS units to be able to efficiently monitor frequencies that are close to the uplink transmission frequency (e.g., for purposes of handover). One way is to use a "compressed mode" type of transmission. In compressed mode, either an increase in coding rate or a reduction in spreading factor (SF) may be used to create a space or a transmission gap (TG) in a frame to be transmitted. Coding rate is indicated by the number of redundant bits per each information bit sent, while SF is indicative of the length of a spreading code, as will be appreciated by those skilled in the art. The idle slots defining the TG collectively have a transmission gap length (TGL). Exemplary compressed mode frames are shown in FIGS. 3-5. TGs in radio frame slots are useful in that a unit may use their idle time to e.g., monitor other frequencies, or perform other tasks.

Compressed mode by reducing the SF results in an increase in bit rate of the physical channels, but the information rate remains approximately constant. A physical channel (PhCH) bit rate is doubled when the SF is reduced by a factor of two. SF is reduced by a factor of two relative to what it normally would be in a normal transmission where all slots in the frame are transmitted with information therein at the information rate. However, when the SF is reduced, power must be increased. For example, when the SF is reduced by a factor of two, this results in a need for an increase in power by a factor of two in order to keep the energy constant as illustrated in FIG. 3.

Assuming an example frame with fifteen (15) slots, a simple reduction in SF by a factor of two (2) results in a TGL of 7.5 slots. Such a TGL may often be longer than necessary, and result in a need for higher peak output power than desired in certain applications, e.g., a doubling of power. It would be desirable to keep such power increases to lower levels.

In addition to reducing a spreading factor (SF), compressed mode may also be achieved by rate matching, e.g., increasing the coding rate on, transport channels (TrCHs) by additional puncturing (i.e., deletion of certain redundant bits). This may achieved by reducing the redundancy of bits sent (i.e., bits are punctured). Compressed mode through rate matching generally means that redundancy is decreased, i.e. bits are punctured, but the bit rate of the physical channel is not altered. Power is then increased to compensate for the reduced redundancy. For example, in a normal mode, fifteen (15) slots per frame are transmitted; while in compressed mode transmission there may be only eleven (11) slots transmitted. In the compressed mode, the TGL is four (4) slots. Power is thus increased by a factor of 15/11 to keep the energy constant. Unfortunately, this rate matching technique is most suitable for obtaining short TGs, and may result in poor performance if extensive puncturing is applied to rate ½ encoded TrCHs.

An object of this invention is to provide improved compressed mode systems/methods in CDMA applications. Compressed mode may be achieved by creating spaces/gaps in frame transmissions. Another object of this invention is to enable a mobile station in a CDMA-based network to monitor other frequencies or perform other tasks during spaces/gaps in transmission.

Another object of this invention is to provided an efficient manner in which to utilize compressed mode in an uplink from a mobile station to a base station in a cellular communications network. TGs in uplink compressed mode frames may be achieved by rate matching and/or SF reduction in different embodiments.

In certain embodiments of this invention, an uplink compressed mode is achieved using both SF reduction and rate matching (i.e., a combination of the two). For example, the SF may be reduced by a factor of two to get twice the bit rate on a channel and the redundancy of bits in the information bit stream may be increased via rate matching to obtain the desired TGL. Thus, there is no need to increase power by a factor of two, and variable length TGLs are achievable, e.g., TGLs having lengths of 1–7 time slots.

In certain example embodiments on an uplink data channel (e.g., on a Dedicated Physical Data Channel, or DPDCH), a reduction of the spreading factor alone by a factor of two may create a TGL of seven and one-half (7.5) slots. However, increased bit redundancy may be used to achieve an actual TGL of five (5) slots. Output power need not be increased as much for a TGL of five slots (power increase by a factor of 15/10 or 3/2), as it would have to be for a TGL of seven and one-half slots (power increase by a factor of 15/7.5=2/1).

In other example embodiments, uplink control channel frames may be formed and transmitted (e.g., on a Dedicated Physical Control Channel, or DPCCH) in compressed mode with TGs. Bit redundancy on the control channel (e.g., of format indicator bits such as TFCI bits) bit may be increased in compressed mode in order to maintain satisfactory performance. In one exemplary embodiment, TFCI bit(s) immediately or directly following the TG may be repeated later in another slot of the frame since these bits may sometimes suffer from slightly worse power control relative to other TFCI bits in the frame. In such embodiments, TGs may be formed using rate matching and/or SF reduction in different embodiments.

BRIEF DESCRIPTION OF THE DRAWINGS

FIG. 12 is a table of DPCCH fields.

FIG. 13(a) is a flow chart/block diagram illustrating how uplink frames are formed to be transmitted from a mobile station (MS).

FIG. 13(b) is a table including parameters for different downlink TGLs in compressed mode.

DETAILED DESCRIPTION OF THE DRAWINGS

In the following description, for purposes of explanation and not limitation, specific details are set forth such as particular architecture, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, algorithms, and methods are omitted so as not to obscure the description of the present invention with unnecessary detail.

GLOSSARY OF CERTAIN TERMS/ABBREVIATIONS

| | |
|---|---|
| BS | Base Station |
| $C_{ch,SF,n}$: | n:th channelization code with spreading factor SF |
| CCTrCH | Coded Composite Transport Channel |
| CDMA | Code Division Multiple Access |
| DCH | Dedicated Channel |

-continued

| | |
|---|---|
| DPCH | Dedicated Physical Channel |
| DPCCH | Dedicated Physical Control Channel |
| DPDCH | Dedicated Physical Data Channel |
| DTX | Discontinuous Transmission |
| FBI | Feedback Information |
| FDMA | Frequency Division Multiple Access |
| MS | Mobile Station |
| Mcps | Mega Chip Per Second |
| $N_{first}$ | First slot in a TG |
| $N_{last}$ | Last slot in a TG |
| OVSF | Orthogonal Variable Spreading Factor (codes) |
| P-CCPCH | Primary Common Control Physical Channel |
| PDSCH | Physical Dedicated Shared Channel |
| PhCH | Physical Channel |
| PL | Pilot |
| SCH | Synchronization Channel |
| SF | Spreading Factor |
| $S_{long,n}$ | n:th DPCCH/DPDCH long uplink scrambling code |
| $S_{short,n}$ | n:th DPCCH/DPDCH short uplink scrambling code |
| TDMA | Time Division Multiple Access |
| TFCI | Transport Format Combination Indicator |
| TG | Transmission Gap |
| TGL | Transmission Gap Length (in slots) |
| TPC | Transport Power Control |
| TrCH | Transport Channel |

Figure 3:
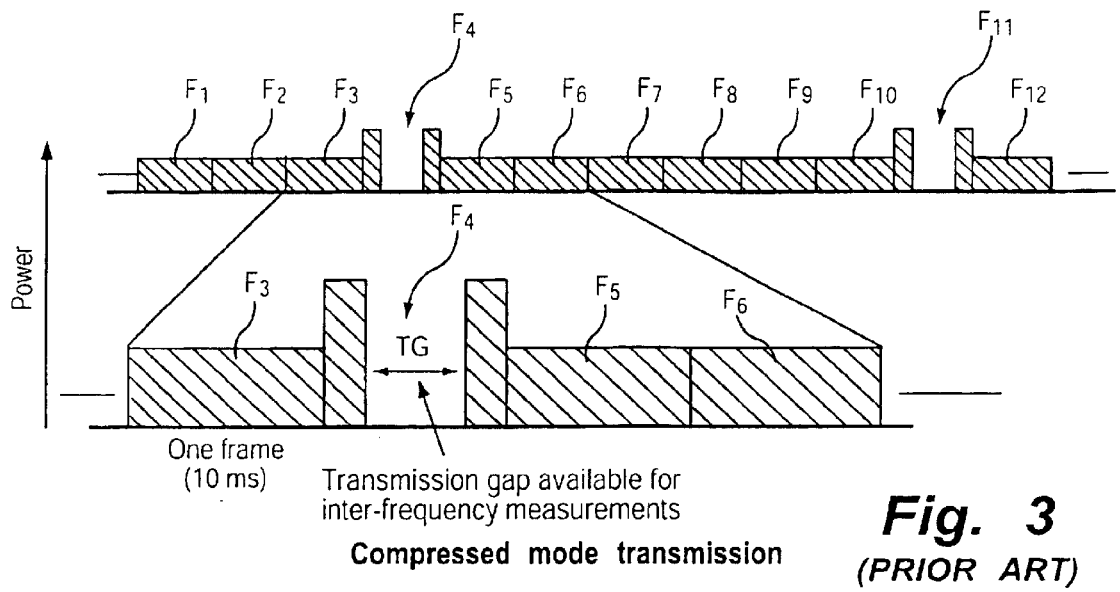
FIG. 3 illustrates a frame in compressed mode transmission, applicable to either an uplink or downlink transmission.

Certain example embodiments of this invention relate to a system and corresponding method for enabling more efficient uplink and/or downlink communications in a compressed mode CDMA environment. Referring to FIG. 3 for example, in uplink compressed mode a transmission gap (TG) is defined in frame $F_4$ and another TG is defined in frame $F_{11}$. The TGs each define a gap or space in the respective frames. As illustrated in FIG. 3, frames $F_1$ through $F_3$, $F_5$ through $F_{10}$, and $F_{12}$ are "normal" frames with no TGs therein. In certain embodiments of this invention to be more fully described below, TGs may be defined by a combination of SF reduction and rate matching so that resulting TGLs may be tailored to desired lengths without power having to be increased as much as would be required with simply a SF reduction. In other embodiments, uplink (or downlink) control channel bits (e.g., TFCI bits, or TPC bits) are repeated in compressed mode frames, and the bits to be repeated are selected based upon where the TG's location and/or length.

Different types of channels are utilized in cellular communication systems/networks. Transport channels (TrCHs) may be viewed as services of the communication protocol and are defined by how and with what characteristics data is transferred over the air interface. Two exemplary transport channels are "dedicated channels" and "common channels." Certain example embodiments of this invention relate to utilization of uplink and/or downlink dedicated channels in a compressed mode of a CDMA-based communications network.

Dedicated physical channels usually include a layered structure of radio frames and time slots, although this is not true for all physical channels. Depending on the symbol rate of a physical channel, the configuration of radio frames or time slots varies. The basic physical communications channel resources in certain embodiments of this invention are identified by spreading code and radio frequency. In addition, on the is uplink, different information streams may be transmitted on the real (I) and imaginary (Q) branches. Consequently, a physical channel may correspond to a specific carrier frequency, spreading code, and (on the uplink) relative phase (0-real or π/2-imaginary).

Figure 1A:
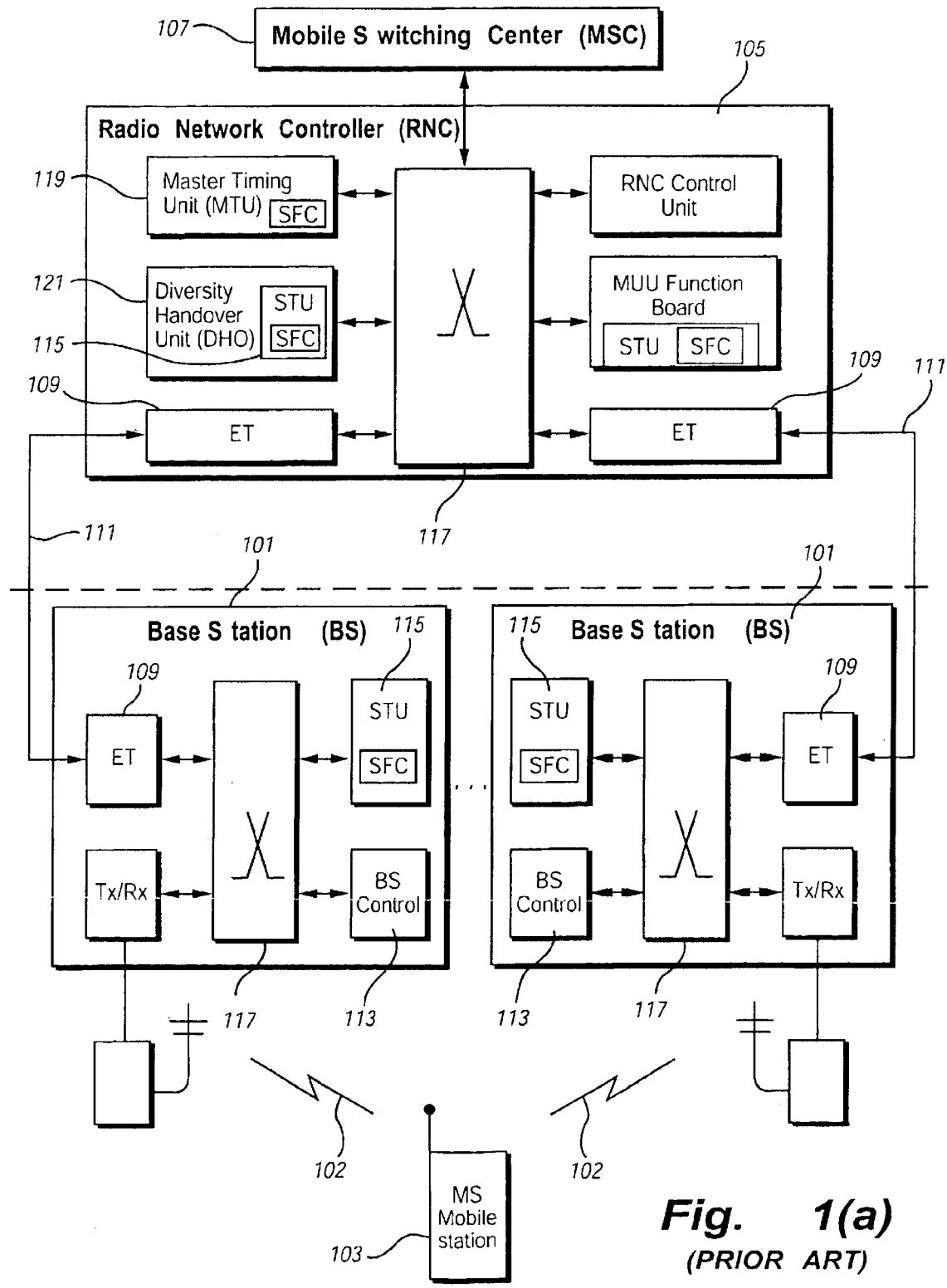
FIG. 1(a) is a block diagram of components of a cellular communications network.
Figure 1B:
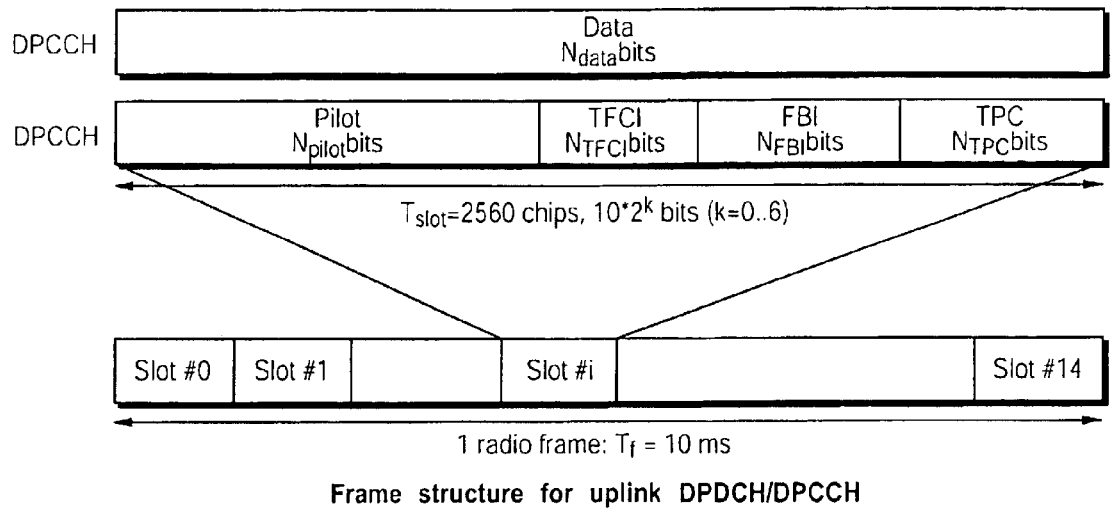
FIG. 1(b) illustrates uplink DPDCH and DPCCD frames, respectively.

FIG. 1(b) illustrates respective "slots" in a "frame" for two types of uplink dedicated physical channels, namely a Dedicated Physical Data Channel (DPDCH) and a Dedicated Physical Control Channel (DPCCH). Each radio frame in FIG. 1(b) includes fifteen (15) time slots, i.e., slot #0 through slot #14. Each time slot includes fields containing bit(s). The number of bits per time slot depends on the physical channel. The DPDCH and the DPCCH, in certain embodiments, may be I/Q code multiplexed within each radio frame.

Generally, the uplink DPDCH (data channel) is used to carry dedicated data generated at Layer 2 and above, i.e. the dedicated transport channel (DCH). There may be zero, one, or several uplink DPDCHs on each Layer 1 connection.

The uplink DPCCH (control channel) is generally used to carry control information generated at Layer 1. The Layer 1 control information may include, for example, pilot bits to support channel estimation for coherent detection, transmit power-control (TPC) commands, feedback information (FBI), and/or an optional Transport-Format Combination Indicator (TFCI). On an uplink, TFCI bits inform the BS receiver of the transmitted signal about instantaneous parameters of the different transport channels multiplexed on the uplink.

Each frame in FIG. 1(b) has, e.g., a length of 10 ms and is split into fifteen (15) time slots, each slot being of length $T_{slot}$=2560 chips, corresponding to one power-control period. Parameter "k" in FIG. 1(b) determines the number of information bits per uplink DPDCH/DPCCH slot, and is related to the spreading factor (SF) of the physical channel as SF=$256/2^k$. The DPDCH spreading factor may range e.g., from 256 down to 4 in different embodiments of this invention. In certain embodiments of this invention, an uplink DPDCH and uplink DPCCH on the same Layer 1 connection may employ different rates, i.e., have different SFs and different values of k. The number of bits in different uplink DPCCH fields ($N_{pilot}$, $N_{TFCI}$, $N_{FBI}$, and $N_{TPC}$) may also vary during a connection.

Exemplary DPDCH fields are set forth below in Table 1. As can be seen, when the SF is reduced by a factor of two, the number of bits per slot doubles. When all slots of a frame are transmitted (i.e., in normal or non-compressed mode), the number of bits per frame also doubles when the SF is reduced by a factor of two as shown in Table 1. However, as will described in more detail below, in compressed mode where a TG is provided (i.e., a number of idle slots), when the SF is reduced by a factor of two, the number of bits per slot transmitted still doubles, but the number of bits per frame does not double because not all slots are transmitted due to the TG.

TABLE 1

DPDCH fields

| Slot Form at #I | Channel Bit Rate (kbps) | Channel Symbol Rate (ksps) | SF | Bits/ Frame | Bits/ Slot | $N_{data}$ |
|---|---|---|---|---|---|---|
| 0 | 15 | 15 | 256 | 150 | 10 | 10 |
| 1 | 30 | 30 | 128 | 300 | 20 | 20 |
| 2 | 60 | 60 | 64 | 600 | 40 | 40 |
| 3 | 120 | 120 | 32 | 1200 | 80 | 80 |
| 4 | 240 | 240 | 16 | 2400 | 160 | 160 |
| 5 | 480 | 480 | 8 | 4800 | 320 | 320 |
| 6 | 960 | 960 | 4 | 9600 | 640 | 640 |

Turning to uplink control channels, certain types of DPCCHs include TFCI bits (e.g., for several simultaneous services) and others do not (e.g., for fixed-rate services). Thus, in Table 2 set forth in FIG. 12 to be described in more detail below, certain formats include TFCI and others do not. For slot formats using TFCI, the TFCI value in each frame corresponds to a certain combination of bit rates of the TrCHs currently in use. This correspondence may be (re-)negotiated at each TrCH addition/removal.

Certain embodiments of this invention, to be set forth below in more detail, relate to formatting of compressed mode DPCCH fields which include TFCI bits (e.g., formats 0A, 0B, 2A, 2B, 5A, and 5B in FIG. 12). There are two possible compressed slot formats for each normal slot format with regard to DPCCH. They are labeled A and B in FIGS. 12 and selection between them is dependent on the number of slots that are transmitted in each frame in compressed mode (i.e., dependent upon the TG and/or TGL), as will be discussed more fully below. It is noted that the channel bit and symbol rates in FIG. 12 are the rates immediately before spreading.

Figure 2:
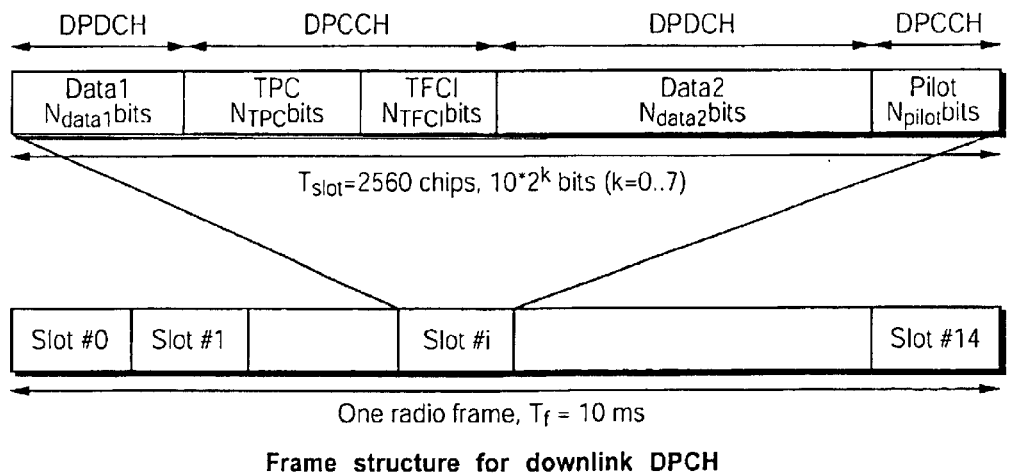
FIG. 2 illustrates a downlink DPCH frame.

Turning briefly to "downlink" dedicated physical channels, reference is made to FIG. 2 which illustrates an exemplary downlink channel known as a downlink Dedicated Physical Channel (downlink DPCH). Within one downlink DPCH, dedicated data generated at Layer 2 and above, i.e. the dedicated transport channel (DCH), is transmitted in time-multiplex with control information generated at Layer 1 (e.g., pilot bits, TPC commands, and optional TFCI). The downlink DPCH can thus be seen as a time multiplex of a DPDCH and a DPCCH, as illustrated in FIG. 2. As illustrated, each frame has a length Tf=10 ms and is split into fifteen (15) time slots, each slot of length $T_{slot}=$ 2560 chips, corresponding to one power-control period, in this exemplary embodiment. Again, certain downlink physical channels include TFCI (e.g., for several simultaneous services) and others do not (e.g., for fixed-rate services).

Radio frames on the uplink or downlink herein may be transmitted in either a "normal" or a "compressed" mode. In normal modes (e.g., see FIGS. 1(b) and 2), information is transmitted in all slots of a frame as discussed above. However, in compressed mode (see FIG. 3), not all slots are used for transmission of information as a TG is present. For example, as an encoded data stream is received for transmission, a first portion of the data from the stream may be transmitted at one instant in time via a normal mode frame transmission and a second portion of the data from the stream may be transmitted at a second instant in time in compressed mode frame transmission including a TG therein. The TG in compressed mode may be utilized by a MS to perform tasks such as making adjacent frequency measurements, acquisition of control channel(s), and/or handover procedures.

FIG. 3 illustrates four (4) frames (uplink or downlink), each frame being of length 10 ms. Three of the four frames are transmitted in normal mode with normal power, while the second frame from the left is transmitted in compressed mode with double power. As can be seen, a transmission gap (TG) is defined in the compressed mode frame, which also causes the need for the power to be increased in that frame as illustrated. In FIG. 3, the "y" or vertical axis is representative of power as illustrated, while the "x" or horizontal axis is representative of time.

When in compressed mode, the information normally transmitted during a 10 ms frame is compressed in time. Mechanisms provided for achieving this are, for example, rate matching by decreasing bit redundancy (puncturing) and/or reduction of the spreading factor SF (e.g., by a factor of two). Thus, in compressed mode, slots $N_{first}$ to $N_{last}$ in the TG of a compressed mode frame are not used for transmission of data. As illustrated in FIG. 3, which is an example of a transmission gap position within a single frame (the gap may be fixed, adjustable, or any other type of gap), the instantaneous transmit power is increased in the compressed frame in order to keep the quality (BER, FER, etc.) unaffected by the reduced processing gain. The amount of power increase depends on the transmission time reduction method (i.e., SF reduction or rate matching) and the transmission gap length (TGL).

Figure 4:
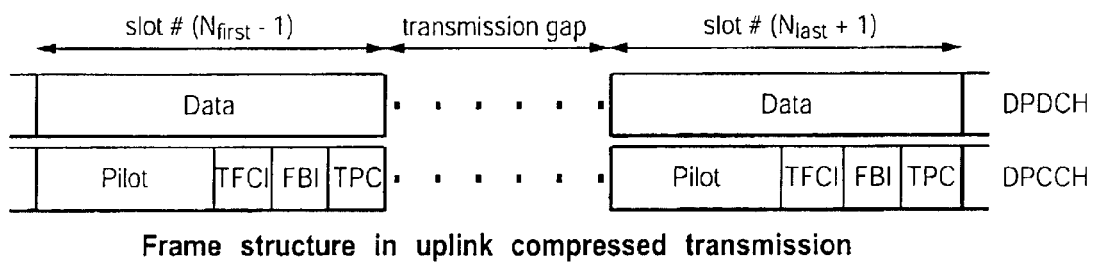
FIG. 4 illustrates uplink DHDCP and DHCCP frames in compressed mode transmission.

FIG. 4 illustrates an uplink DPDCH and an uplink DPCCH in compressed modes, each having a TG defined in a central portion thereof. As can be seen, no slots are transmitted during the TG.

Figure 5A:
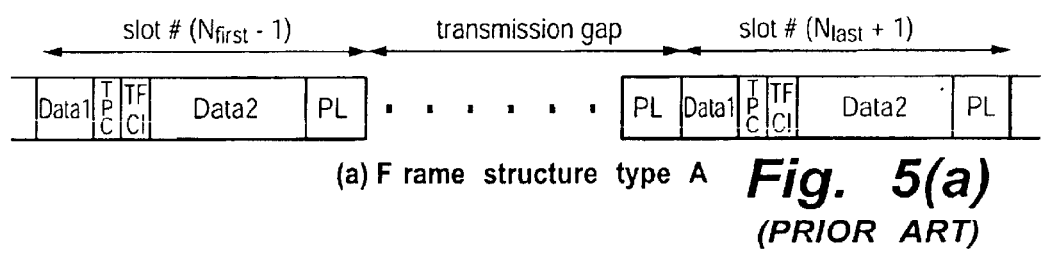
FIG. 5(a) illustrates a downlink frame in a first type of compressed mode transmission.
Figure 5B:
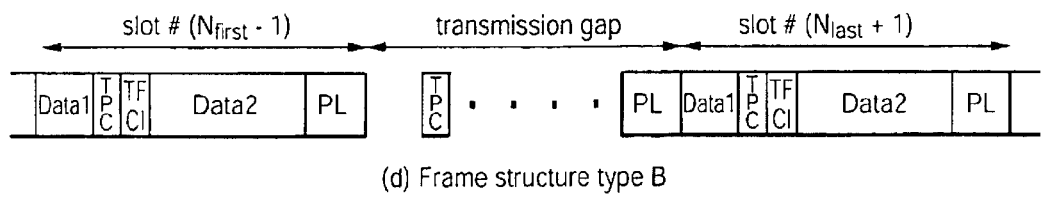
FIG. 5(b) illustrates a downlink frame in a second type of compressed mode transmission.

FIGS. 5(a) and 5(b) illustrate two different types of frame structures for downlink compressed modes. The frame structure in FIG. 5(a) maximizes the transmission gap length and the frame structure in FIG. 5(b) optimizes power control. With the frame structure of FIG. 5(a), the pilot field of the last slot ($N_{last}$) in the transmission gap is transmitted. There is no transmission during the rest of the transmission gap. With the frame structure of FIG. 5(b), the TPC field of the first slot ($N_{first}$) in the transmission gap and the pilot field of the last slot ($N_{last}$) in the transmission gap are transmitted. Transmission is turned off during the rest of the transmission gap.

As discussed above, the disadvantage of simply reducing the SF by a factor of two to achieve compression mode (with a TG of 7.5 slots) is that the power has to then be increased by a factor of two (i.e., doubled). This is because the resulting TG is 7.5 slots, and 15.0/7.5=2.0. Moreover, the disadvantage of using rate matching (i.e., decreased bit redundancy) to achieve compression mode is that it is only useful for short TGs, as discussed above.

Thus, according to one embodiment of this invention, compressed mode in, e.g., an uplink dedicated channel (e.g., DPDCH) is achieved through a combination of SF reduction (e.g., by a factor of two) and rate matching (e.g., by increased bit redundancy). A reduction in the SF by a factor of two (e.g., from 256 to 128) alone results in twice the bit rate on the physical channel and a TGL of 7.5 slots. When an increase in redundancy of the information bit stream (e.g., via rate matching) is combined with the SF reduction, however, the TGL can be tailored or adjusted so that the desired TGL is achieved. For example, while the simple reduction of SF by a factor of two would result in a TGL of 7.5 slots, the provision of the increased redundancy may be used to achieve a smaller TGL of e.g., five (5) slots. The power increase requirements are less for a TGL of five (5) slots (combined SF reduction by factor of two and increased redundancy) than for a TGL of 7.5 slots (simple SF reduction by factor of two with no increased redundancy). This technique may be applied to DPDCH, DPCCH, and/or any other suitable type of physical channel. It may also be only applied to the DPHCH, while another compressed mode technique (involving FIGS. 7-10 and 12, with potentially no SF reduction) may be applied to the DPCCH.

In other words, SF reduction may be combined with repetition (rate matching) to fill all slots outside of the desired TG. On the uplink, mobile power amplifier is peak power limited, so that it may be better in certain circumstances to transmit a certain energy over as long of a time as possible to keep the power as low as possible, thereby maximizing uplink coverage. Certain embodiments of this invention satisfy these goals.

Figure 6:
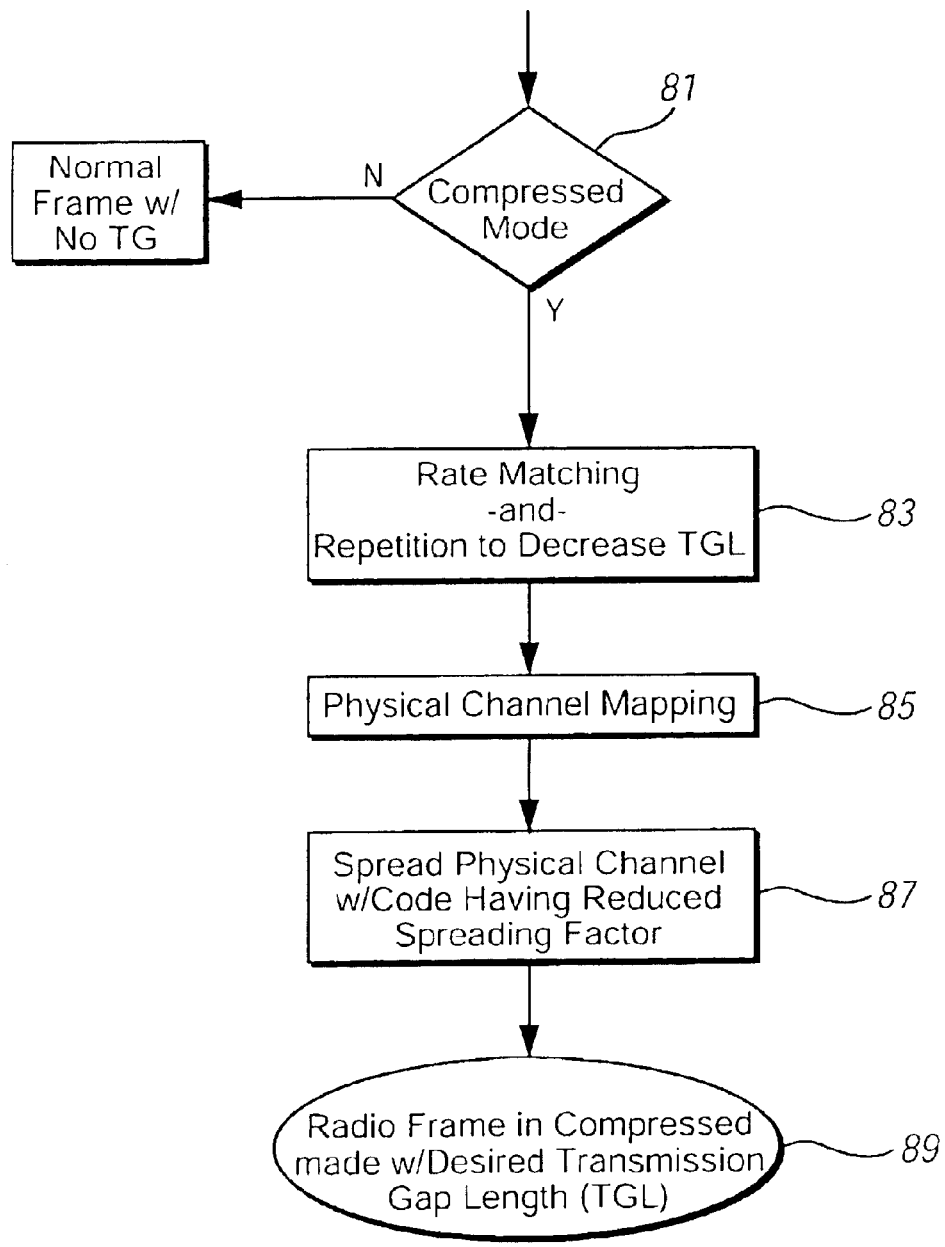
FIG. 6 is a flowchart illustrative of steps taken in forming a radio frame for an uplink so as to include at least one transmission gap therein in a compressed mode, including reducing the spreading factor and using an increase in information bit redundancy (i.e. repetition) to obtain the desired TGL.

FIG. 6 is a flowchart illustrating an embodiment where both SF reduction and rate matching are used together in order to define a TG in an uplink frame. Following frame segmentation, rate matching is performed (e.g., bit repetition) at 83 if it was determined at 81 that a frame is to be a compressed mode frame. Knowing that the SF is going to be reduced by a predetermined factor (e.g., two), bit repetition is performed at 83 in order to tailor the TGL to the desired length. Thereafter, channel mapping 85 occurs and the encoded data is spread (e.g. via DS-CDMA) at 87 with a signature sequence or spreading code having the reduced spreading factor. Compressed mode frame(s) with desired TGLs are output 89.

The manner in which the calculations for increased redundancy in step 83 are performed in accordance with certain embodiments of this invention will be described below within the context, e.g., of FIG. 6 in the area of rate matching.

According to another embodiment of this invention, TFCI bit redundancy may also be increased in the context of an uplink control channel (e.g., DPCCH) in compressed mode. In compressed mode, during the TG the DPDCH and DPCCH are turned off, and thus the number of TFCI bits may be reduced, especially when rate matching is used. Referring to FIG. 4 for example, in compressed mode no TFCI bits are transmitted during the TG. TFCI bits are important for the detection at the receiver (e.g. BS) and extensive puncturing of TFCI bits is not desirable. In downlink applications, this problem may be addressed by modifying frame formats in compressed mode so that TFCI bits can be sent in the DPDCH instead of the DPCCH. This is not practical in uplink applications, however, since the SF is varying on the DPDCH (i.e., the SF may be different for the DPDCH than for the DPCCH). The SF is not known until TFCI bits have been decoded.

Thus, two potential solutions for compressed mode for uplink DPCCH include: (1) reduction of SF by a factor of two, or (2) changing frame format of DPCCH in compressed mode so as to repeat TFCI bits. Alternative (2) is first described below, followed by an explanation as to why it may be better than alternative (1) in certain applications.

As for the DPCCH, extra bit room may be created in compressed mode, e.g., by additional bit puncturing. In one embodiment of this invention, this excess bit room or space is used to increase the redundancy of TFCI in uplink DPCCH compressed mode transmissions. The redundant bits are transmitted in slot(s) where excess or available space is located. This increase in TFCI bits may be done at the expense of other bits, such as pilot bits.

Exemplary DPCCH compressed mode formats are shown in FIG. 12. Compressed mode formats are, e.g., formats 0A, 0B, 2A, 2B, 5A, and 5B. It is noted that only formats that include TFCI bits need be modified in compressed mode in certain embodiments (i.e., formats 0, 2 and 5).

Generally speaking, the number of idle slots in one compressed mode frame is 1-7 slots. Idle slots means the number of slots in the TG in each frame. Given numbers of TFCI bits are needed per transmitted slot in most applications, so that e.g., at least thirty (30) may be transmitted per frame. For example, for 15 transmitted slots per frame, 2 TFCI bits are needed per slot for a total of 30 TFCI bits per frame; for 13 transmitted slots per frame, 3 TFCI bits are needed per slot so that the total number of TFCI bits per frame will be at least 30 (39 in this case); for 11 transmitted slots per frame, 3 TFCI bits are needed per slot so that the total number of TFCI bits per frame will be at least 30 (33 in this case); for 10 transmitted slots per frame, 3 TFCI bits are needed per slot so that the total number of TFCI bits per frame will be at least 30 (30 in this case); for 9 transmitted slots per frame, 4 TFCI bits are needed per slot so that the total number of TFCI bits per frame will be at least 30 (36 in this case); for 8 transmitted slots per frame, 4 TFCI bits are needed per slot so that the total number of TFCI bits per frame will be at least 30 (32 in this case), and so on. A TFCI codeword may be of any suitable length herein, however in preferred embodiments it may be 30 or 32 bits long.

Transmission in 13 and 14 slots per frame is typically only done when the TG spans two consecutive frames, and is therefore not expected to be a frequent occurrence. Disregarding the cases of 13 and 14 transmitted slots, there is at most room for 6 more bits than needed (when 9 bits or 12 bits are transmitted in a frame, 36 bits are available; so 36-30=6 available bits). In accordance with an embodiment of this invention, TFCI bits from earlier slots in a frame are repeated and transmitted in these "extra" bit areas. In most cases, the number of extra bits will be limited (e.g., 6 or less) and a simple repetition scheme can be effectively used. The slots directly after the TG suffer from slightly worse power control in certain environments, and it is therefore deemed beneficial to repeat the TFCI bits of these slots in the extra bit areas in the latter slots, in accordance with preferred embodiments of this invention.

Referring to FIGS. 7-10, four different examples of TFCI bit repetition will now be described with regard to a DPCCH in a wideband CDMA cellular telephone communications network. TFCI bits are referred to by $c_{29}, C_{28}, C_{27}, \ldots c_0$, and the extra bits referred to by $d_{D\text{-}31}, d_{D\text{-}32}, d_{D\text{-}33}, \ldots d_0$, where "D" is the number of available TFCI bits in the compressed mode frame. The first TFCI bit in a frame following the TG is called CE, where $E = 29 - (N_{first}N_{TFCI})$ mod 30. The repeated bits are thus $d_{D\text{-}31} = C_{E \bmod 30}$, $d_{D\text{-}32} = c_{(E\text{-}1) \bmod 30}$, $d_{D\text{-}33} = c_{(E\text{-}2) \bmod 30}$, K, $d_0 = C_{(E\text{-}(D\text{-}30\text{-}1)) \bmod 30}$. Bits $c_k$ are then mapped to the TFCI fields in descending order followed by $d_k$ in descending order, i.e., $c_{29}$ is sent in the first slot in the frame and do is sent in the last slot in the frame. Accordingly, as will be seen with reference to FIGS. 7-10 below, TFCI bits c from the slot immediately following the TG are repeated in a later slot in the frame.

Figure 7:
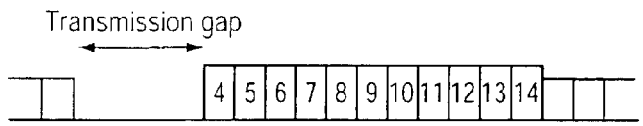
FIG. 7 illustrates an uplink DPCCH frame structure having a TG defined in an example according to an embodiment of this invention.

FIG. 7 illustrates an example where the DPCCH frame is sent with a TG occupying slots 0–3 (i.e., the first four slots of the frame). Thus, approximately eleven slots are transmitted in the frame (i.e., slots 4-15). As discussed above, when 11 slots are transmitted per frame, 3 TFCI bits are provided per slot so that the total number of available TFCI bits in such a frame is 33 (i.e., D=33). Accordingly, three TFCI bits may be repeated because 33-30=3. For the FIG. 7 example, E=29-0=29 and $d_2 = c_{29}$, $d_1 = c_{28}$, and $d_0 = c_{27}$. In other words, three TFCI bits will be repeated in the last slot of the frame in FIG. 7, these three repeated TFCI bits $c_{29}$, $c_{28}$, and $c_{27}$ being the first three TFCI bits in the first transmitted slot in the frame, i.e. from slot number 4. As discussed above, the calculation is set up so that the TFCI bits which are repeated in the last slot(s) of the frame are the TFCI bits that immediately follow the TG, as these are the most likely to suffer from power control problems.

Figure 8A:
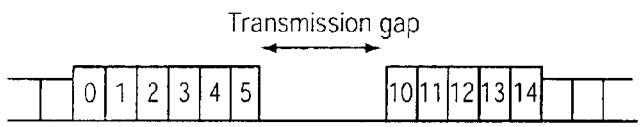
FIGS. 8(a) and 8(b) illustrate an uplink DPCCH frame structure having a TG defined in another example according to an embodiment of this invention.
Figure 8B:
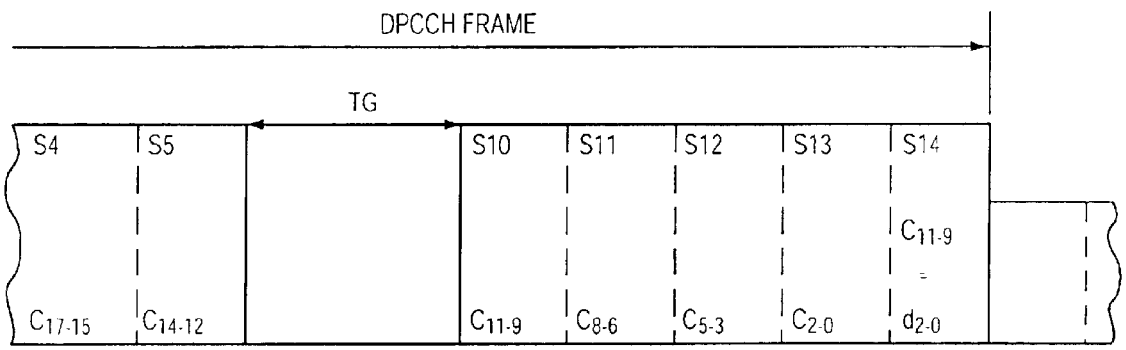

FIGS. 8(*a*) and 8(*b*) illustrate another example, where the DPCCH frame is sent with a TG occupying slots 6-9. Thus, approximately eleven slots are transmitted in the frame (i.e., slots 0-5 and 10-14). Again, when slots are transmitted per frame, 3 TFCI bits are available per slot so that the total number of available TFCI bits in such a frame is 33 (i.e., D=33). Thus, for the FIG. 8 example, E=29-18=11 and $d_2 = c_{11}$, $d_1 = c_{10}$, and $d_0 = c_9$. In other words, three TFCI bits will be repeated in the last slot of the frame in FIG. 8 as shown in slot S14 in FIG. 8(*b*), these three repeated TFCI bits $c_{11}$, $c_{10}$, and $c_9$ being the first three TFCI bits in the first transmitted slot S10 following the TG.

Figure 9:
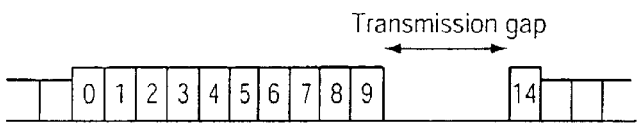
FIG. 9 illustrates an uplink DPCCH frame structure having a TG defined in another example according to an embodiment of this invention.

FIG. 9 illustrates another example, where the DPCCH frame is sent with a TG occupying slots 10-13. Thus, approximately eleven slots are transmitted in the frame (i.e., slots 0-9 and 14). Again, when 11 slots are transmitted per frame, 3 TFCI bits are available per slot so that the total number of available TFCI bits in such a frame is 33 (i.e., D=33). Thus, for the FIG. 9 example, E=29-30mod30=29 and $d_2=c_{29}$, $d_1=c_{28}$, and $d_0=c_{27}$. In other words, three TFCI bits will be repeated in the last slot of the frame in FIG. 9, these three repeated TFCI bits $c_{29}$, $c_{28}$, and $c_{27}$ being the first three TFCI bits in the first transmitted slot in the frame. In this particular example, there are no TFCI bits to be repeated in the slot after the TG, as this slot is where the extra TFCI bit availability is located. In other words, all the original TFCI bits c were transmitted in slots 1-9, and none were located after the TG.

Figure 10:
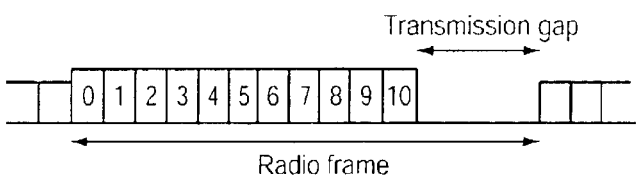
FIG. 10 illustrates an uplink DPCCH frame structure having a TG defined in another example according to an embodiment of this invention.

FIG. 10 illustrates another example, where the DPCCH frame is sent with a TG occupying slots 11-14. Thus, approximately eleven slots are transmitted in the frame (i.e., slots 0-10). Again, when 11 slots are transmitted per frame, 3 TFCI bits are available per slot so that the total number of available TFCI bits in such a frame is 33 (i.e., D=33). Thus, for the FIG. 10 example, E=29-33mod30=26 and $d_2=c_{26}$, $d_1=c_{25}$, and $d_0=c_{24}$. In other words, three TFCI bits will be repeated in the last slot of the frame in FIG. 10, these three repeated TFCI bits being $c_{26}$, $c_{25}$, and $c_{24}$.

FIG. 12 illustrates examples of different DPCCH slot formats according to different embodiments of this invention. As can be seen in TFCI inclusive formats 0, 2 and 5, the number of TFCI bits per frame is dictated by the number of transmitted slots per frame pursuant to the calculation techniques set forth above. For example, in format 0A where 10-14 slots are transmitted per frame, 3 TFCI bits are transmitted per frame; while in format 0B where 8-9 slots are transmitted per frame, 4 TFCI bits are transmitted per frame so that the receiver always is sent at least 30 TFCI bits per frame (or any number sufficient to satisfy a substantial portion of the TFCI codeword). It is noted that in FIGS. 7-10 and 12, the TG is preferably achieved by rate matching (not by reduction of SF).

Another potential way, referred to above by alternative (2), in which to achieve compressed mode in the context of DPCCH is through SF reduction. This would result in the number of bits in all DPCCH fields, including TFCI fields, being doubled. Power would also have to be doubled when SF is reduced by a factor of two, at least in the TFCI fields, since the same amount of information has to be sent in half the number of slots (TGL=7.5 slots). In contrast, when rate matching is used to define the TGL to the desired length (i.e., less than 7.5 slots), there is room for extra TFCI bits as discussed above, and the power need not be increased as much.

If the SF of the DPCCH is reduced by a factor of two as in alternative (1), only one additional frame format is needed for each frame format that includes TFCI. This extra frame format could be derived from the original one by multiplying the number of bits in each field by two. If instead two additional frame formats are added for each frame format with TFCI field, as described above in alternative (2) and shown in FIG. 12, more memory is needed for storage but the increase in output power is lower. For SF reduction the power of the DPCCH must be doubled since twice as many TFCI bits are sent in each slot.

With the alternative (2) of FIGS. 7-10 and 12, the TFCI field is extended at the expense of e.g., the pilot field, and the power need only be increased so that the total pilot power is kept about constant. If the power in a non-compressed (normal) mode is P, then the power needs to be increased to 6/5P for format 0A in FIG. 12 above (compare pilot bits in format 0 versus format 0A). This is compared with a twofold increase in power for the SF reduction method. The power of the DPCCH is expected to be in the order of 3 dB less than the power of the DPDCH for lower bit rate CCTrCHs. The difference in total power between the two methods for format 0A in FIG. 12 with three (3) idle slots (SF reduction for DPCCH vs. FIG. 12 type format changing for DPCCH) may be calculated as 0.85 dB as in the provisional application which is incorporated herein by reference. This value corresponds to a maximum gain. For higher numbers of idle slots and formats with shorter pilot, the difference will be smaller. Format 2B in FIG. 12 with 4 idle slots results in 0.3 dB.

The power relation between DPDCH and DPCCH is not 3 dB in compressed mode as the frame format change is compensated in power. The increased power of the TPC bits may to some extent compensate for the loss of a few TFC commands. It is noted that the calculated power savings becomes smaller for high bit rate CCTrCHs (which have a large power difference between the DPDCH and DPCCH). The gain for lower bit rate CCTrCHs is, however, significant and beneficial, thereby illustrating the advantage of the DPCCH format modification (alternative (2)) approach shown in FIGS. 7-10 and 12, where SF need not be reduced. As mentioned above, the SF may be reduced for DPDCH, but not for DPCCH, in the same transmission, i.e., the SF need not be the same for both channels.

According to an exemplary non-limiting embodiment of this invention, it will now be described how an uplink compressed mode communication is made from a MS to a BS in accordance with an embodiment of this invention.

FIG. 13(a) is a block diagram/flow chart illustrating multiplexing and channel coding steps for uplink communications. Informational bits $a_{im1}$, $a_{im2}$, $a_{im3}$, ..., $a_{imA}$, in a transport block are delivered to layer 1, where $A_i$ is the length of a transport block of TRCH i, and m is the transport block number. Error detection is provided on transport blocks through a Cyclic Redundancy Check. Thus, Cyclic Redundancy Code (CRC) is attached at 21. The CRC may be 24, 16, 12, 8 or 0 bits, and the desired length for each TRCH may be signaled from higher.

The bits input to transport block concatenation 23 are $b_{im1}$, $b_{im2}$, $b_{im3}$, ..., $b_{imBi}$ where i is the TRCH number, m is the transport block number, and $B_i$ is the number of bits in each block. Segmentation of the bit sequence from transport block concatenation is performed, so that the code blocks after segmentation are of the same size.

Code blocks are delivered to channel coding block 25. They are denoted by $O_{ir1}$, $O_{ir2}$, $O_{ir3}$, ..., $O_{irK1}$, where i is the TrCH number, r is the code block number, and $K_i$ is the number of bits in each code block. The encoded blocks are serially multiplexed so that the block with lowest index r is output first from the channel coding block. The bits output are $C_{i1}$, $C_{i2}$, $C_{i3}$, ..., $c_{iEi}$, where i is the TrCH number and $E_i$ the number of bits. In different embodiments of this invention, convolutional coding (e.g., rate ½ or rate ⅓), turbo coding (e.g., rate ⅓), and or no channel coding may be performed at 25.

Radio frame size equalization 27 pads the input bit sequence in order to ensure that the output can be segmented in data segments of same size. The output bit sequence from equalization block 27 is $t_{i1}$, $t_{i2}$, $t_{i3}$, ..., $t_{iTi}$, where i is the TrCH number and $T_i$ the number of bits.

First interleaving 29 may utilize a block interleaver with inter-column permutations. The bits output from the $1^{st}$ interleaving are denoted by $d_{i1}, d_{i2}, d_{i3}, \ldots, d_{iTi}$.

When the transmission time interval is longer than 10 ms, the input bit stream or sequence to 31 is segmented and mapped onto consecutive radio frames. The $n_i$-th segment is mapped to the $n_i$-th radio frame of the transmission time interval (TTI). The output bit sequence corresponding radio frame $n_i$ is $e_{i1}, e_{i2}, e_{i3}, \ldots, e_{iNi}$, where i is the TRCH number and $N_i$ is the number of bits.

In rate matching block 33, bits on a transport channel are repeated or punctured. This is where, on the uplink, the increasing or decreasing of redundancy of bits is performed. Higher layers assign a rate-matching attribute for each transport channel TrCH. This attribute is semi-static and is changeable through higher layer signaling. The rate-matching attribute is used when the number of bits to be repeated or punctured is calculated. The number of bits on a TrCH can vary between different transmission time intervals. When the number of bits between different transmission time intervals in uplink is changed, bits are repeated (i.e., repetition) or punctured to ensure that the total bit rate after TrCH multiplexing is identical to the total channel bit rate of the allocated dedicated physical channels. Rate matching block 33 is controlled by rate matching algorithm 35. In certain embodiments, the following relations may be used when calculating the rate matching parameters:

$$Z_{0,j} = 0 \quad (1)$$

$$Z_{ij} = \left\lfloor \frac{\sum_{m=1}^{i} RM_m \cdot N_{mj}}{\sum_{m=1}^{I} RM_m \cdot N_{mj}} \cdot N_{data,j} \right\rfloor \text{ for all } i = 1 \ldots I$$

$$\Delta Z_{ij} = Z_{ij} - Z_{i-1,j} - N_{ij} \text{ for all } i = 1 \ldots I$$

where $N_{ij}$ for uplink is the number of bits in a frame before rate matching on TrCH i with a transport format combination j; $Z_{ij}$ is an intermediate calculation variable; $\Delta N_{ij}$ if positive for uplink, represents the number of bits that should be repeated (i.e., repetition) in each radio frame on TrCH i with transport format combination j, and if negative for uplink, represents the number of bits that should be punctured in each frame on TRCH i with transport format combination j; $N_{data,j}$ is the total number of bits available for the CCTrCH in a frame with transport format combination j; $RM_i$ is a semi-static rate matching attribute for transport channel i that is signaled form higher layers; and I is the number of TrCHs in the CCTrCH.

In uplink normal mode, puncturing can be applied to match the CCTrCH bit rate to the PhCH bit rate. In compressed mode, however, as discussed above, redundancy may be provided (or puncturing decreased) so as to reduce the TGL from the 7.5 slot value which would be provided if only SF reduction by a factor of two was used. This is where the rate matching step is performed, which is to be combined with the reduction of SF, in order to tailor the TGL in certain data uplink channels (e.g., DPDCH).

The number of bits to be repeated or punctured, AIV, within one radio frame for each TRCH i is calculated with equation (1) for all possible transport format combinations j and selected every radio frame. It is noted that different rate matching may be performed for DPDCH and DPCCH, since compressed mode may be achieved for DPDCH via a combination of reduction in SF and rate matching, while compressed mode may be achieved for DPCCH using only rate matching (puncturing).

In compressed mode, in accordance with the aforesaid embodiment of this invention where SF reduction is combined with rate matching for a channel (e.g. DPDCH), $N_{data,j}$ is replaced by $N_{data,j}{}^{cm}$ in Equation (1). By changing this equation, the exact TGL desired may be achieved through a combination of SF reduction (e.g., by a factor of two) and rate matching at block 33. Value $N_{data,j}{}^{cm}$ is given from the following relation: $N_{data,j}{}^{cm} = 2N_{data,j} - 2N_{TGL}$, for compressed mode by at least spreading factor reduction; where $N_{TGL}$ is calculated by:

$$\begin{cases} \frac{TGL}{15} N_{data,j}, \text{ if } N_{first} + TGL \leq 15 & (2) \\ \frac{15 - N_{first}}{15} N_{data,j}, \text{ in first frame if } N_{first} + TGL > 15 & (3) \end{cases}$$

$$\frac{TGL - (15 - N_{first})}{15} N_{data,j}, \text{ in second frame if } N_{first} + TGL > 15 \quad (4)$$

where $N_{first}$ is the first slot in the transmission gap (TG); $N_{last}$ is the last slot in the TG ($N_{last}$ is either a slot in the same frame as $N_{first}$ or a slot in the frame immediately following the slot that contains $N_{first}$); and TGL is the transmission gap (TG) length indicating the number of consecutive empty slots (0<=TGL<=14).

Alternatively, the same effect is achieved if equations (2)-(4) are:

$$N_{TGL} = \begin{cases} 2\frac{TGL}{15} N_{data,j}, \text{ if } N_{first} + TGL \leq 15 & (2) \\ 2\frac{15 - N_{first}}{15} N_{data,j}, \text{ in first frame if } N_{first} + TGL > 15 & (3) \end{cases}$$

$$2\frac{TGL - (15 - N_{first})}{15} N_{data,j}, \text{ in second frame if } N_{first} + TGL > 15 \quad (4)$$

and $N^{cm}{}_{data,j} = 2N_{data,j} - N_{TGL}$, as discussed in the parent provisional application, which is incorporated herein by reference.

In either case, we change $N_{data,j}$ to $N_{data,j}{}^{cm}$ in order to adjust the redundancy so that we get the desired TGL. As shown above, we double $N_{data,j}$ since the bit rate was doubled by reducing the SF by a factor of two. We then subtract therefrom the number of bits that corresponds to the desired TGL of the TG. The resulting value $N_{data,j}{}^{cm}$ is inserted into equation (1) so that the redundancy is increased (see below) so that the desired TGL ail is achieved.

If $\Delta N_{ij} = 0$ (in either compression mode or normal mode), then the output data of the rate matching is the same as the input data and the rate matching algorithm 35 does not need to be executed.

If $\Delta N_{ij} \neq 0$, then $e_{ini}$, $e_{plus}$, and/or $e_{minus}$ are determined, regardless of whether the radio frame is compressed or not; where $e_{ini}$ is the initial value of variable e in the rate matching pattern determination algorithm 35, and $e_{plus}$ and $e_{minus}$ each represent an increment value and decrement value of e, respectively. Thus, when $\Delta N_{ij} \neq 0$, variable e is adjusted accordingly, either up or down, so that the rate may be matched to the desired rate; and in the compressed mode so that the TGL may be tailored to its desired length. For example, puncturing may be performed if $\Delta N_i < 0$, and repetition otherwise. Note that in certain embodiments where repetition is implemented, a repeated bit may be placed directly after the original one or in any other suitable location.

In certain embodiments, a rate matching function may be implemented as follows for determining the rate matching pattern:

```
if puncturing is to be performed
    e = e_ini        -- initial error between current and desired puncturing
       ratio
    m = 1            -- index of current bit
    do while m <= X_i
        e = e - e_minus      -- update error
        if e <= 0 then       -- check if bit number m should be
                                punctured
            set bit x_{i,m} to δ where δ ∉ {0, 1}
            e = e + e_plus   -- update error
        end if
        m = m + 1            -- next bit
    end do
else
    e = e_ini        -- initial error between current and desired puncturing
       ratio
    m = 1            -- index of current bit
    do while m <= X_i
        e = e - e_minus      -- update error
        do while e <= 0      -- check if bit number m should be repeated
            repeat bit x_{i,m}
            e = e + e_plus   -- update error
        end do
        m = m + 1            -- next bit
    end do
end if
```

Further details regarding the rate matching algorithm may be found in, for example, Technical Specification 3G TS 25.212 V3.1.0 (1999-21), 3$^{rd}$ Generation Partnership Project; Technical Specification Group Radio Access Network; Multiplexing and channel coding (FDD), available from 3GPP Organizational Partners, 650 Route des Lucioles—Sophia Antipolis,: Valbonne, France; the entire disclosure of which is hereby incorporated herein by reference. See also www.3gpp.org.

Every 10 ms, one radio frame from each TrCH is delivered to the TrCH multiplexing 37. These frames are serially multiplexed into a coded composite transport channel (CCTrCH). The bits input to the TICH multiplexing are $f_{i1}$, $f_{i2}, f_{i3}, \ldots, f_{iVi}$, where i is the TrCH number and $V_i$ is the number of bits in the radio frame of TrCH i. The bits output from TrCH multiplexing are $S_1, S_2, S_3, \ldots, S_S$, where S is the number of bits.

When more than one PhCH is used, physical channel segmentation 39 divides the bits among the different PhCHs. The bits input to the physical segmentation are $S_1, S_2, S_3 \ldots, S_S$. The bits after physical channel segmentation are $u_{p1}, u_{p2}, u_{p3}, \ldots, u_{pU}$, where p is PhCH number and U is the number of bits in one radio frame for each PhCH.

The 2$^{nd}$ interleaving 41 is a block interleaver with intercolumn permutations. The bits input to the 2$^{nd}$ interleaver are $u_{p1}, u_{p2}, u_{p3}, \ldots, u_{pU}$, where p is PhCH number and U is the number of bits in one radio frame for one PhCH.

Following the second interleaving 41, bits $v_{p1}, v_{p2}, \ldots, v_{pu}$ are input to physical channel mapping 43, where p is the PhCH number and U is the number of bits in one radio frame for one PhCH. The bits $V_{pk}$ are mapped to the PhCHs so that the bits for each PBCH are transmitted over the air in ascending order with respect to k (bit number).

In compressed mode, no bits are mapped to certain slots of the PhCH(s). If $N_{first}+TGL \leq 15$, no bits are mapped to slots $N_{first}$ to $N_{last}$. If $N_{first}+TGL > 15$, i.e. the transmission gap spans two consecutive radio frames, the mapping is as follows:

In the first radio frame, no bits are mapped to slots $N_{first}$ $N_{first}+1, N_{first}+2, \ldots, 14$.

In the second radio frame, no bits are mapped to the slots $0, 1, 2, \ldots, N_{last}$.

Transport format detection can be performed both with and without Transport Format Combination Indicator (TFCI), as discussed above. If a TFCI is transmitted, the receiver detects the transport format combination from the TFCI. However, when no TFCI is transmitted the receiver may detect the transport format combination using some information, e.g. received power ratio of DPDCH to DPCCH.

Preferably, TFCI bits inform the receiver of the transport format combination of the CCTrCHs. As soon as the TFCI is detected, the transport format combination, and hence the individual transport channels' transport formats are known, and decoding of the transport channels can be performed.

In certain embodiments, the TFCI bits are encoded using a (32, 10) sub-code of the second order Reed-Muller code. If the TFCI consists of less than 10 bits, it may be padded with zeros to 10 bits, by setting the most significant bits to zero. The length of the TFCI code word is 32 bits in certain embodiments.

In non-compressed modes, bits of TFCI code words are directly mapped to the slots of the radio frame. The coded bits $b_k$, are mapped to the transmitted TFCI bits $d_k$, according to the following formula: $d_k=b_k$ mod 32. For uplink physical channels regardless of the SF and downlink physical channels, if SF>128, k=0, 1, 2, ..., 29. Note that this means that bits $b_{30}$ and $b_{31}$ are not transmitted. For downlink physical channels whose SF<128, k=0, 1, 2, ..., 119. Note that this means that bits $b_0$ to $b_{23}$ are transmitted four times and bits $b_{24}$ to $b_{31}$ are transmitted three times.

The mapping of the TFCI bits in compressed mode is different for uplink, downlink with SF≧128 and downlink with SF<128. For uplink compressed mode, the slot format is changed so that no TFCI bits are lost as discussed above regarding DPCCH. The different slot formats in compressed mode do not match the exact number of TFCI bits for all possible TGLs. Repetition of the TFCI bits is therefore used as previously discussed regarding FIGS. 7-10 and 12. The number of bits available in the TFCI fields of one compressed radio frame is D and the number of bits in the TFCI field in a slot is $N_{TFCI}$. Bit E is the first bit to be repeated, $E=N_{first}N_{TFCI}$. If $N_{last}\ne 14$, then E corresponds to the number of the first TFCI bit in the slot directly after the TG. The following relations then define the mapping.

$$d_k=b_{k \bmod 32}$$

where k=0, 1, 2, ..., min (31, D−1).

If D>32, the remaining positions are filled by repetition (in reversed order):

$$d_{D-k-1}=b_{(E+k) \bmod 32}$$

where k=0, ..., D−33. Also, the equations listed above regarding FIGS. 7-10 and 12 may be used to determine which TFCI bits to repeat in a frame.

Transmission gaps (TGs) can be placed at both fixed positions and adjustable positions for purposes such as interfrequency power measurement, acquisition of control channel of other system/carrier, and actual handover operation. When using single frame method (i.e., "S" in FIG. 13(b)), the fixed transmission gap is located within the compressed frame depending on the transmission gap length (TGL) (e.g., see FIGS. 3-5). When using double frame method (i.e., "D" in FIG. 13(b), where in (x, y) "x" indicates the number of idle slots in the first frame and "y" the number of idle slots in the second frame), the fixed transmission gap is located on the center of two connected frames. When the transmission gap spans two consecutive radio frames in such a manner, $N_{first}$ and TGL are chosen so that at least 8 slots in each radio frame are transmitted. Alternatively, the position of transmission gaps can be adjustable/relocatable for some purpose e.g. data acquisition.

Figure 14:
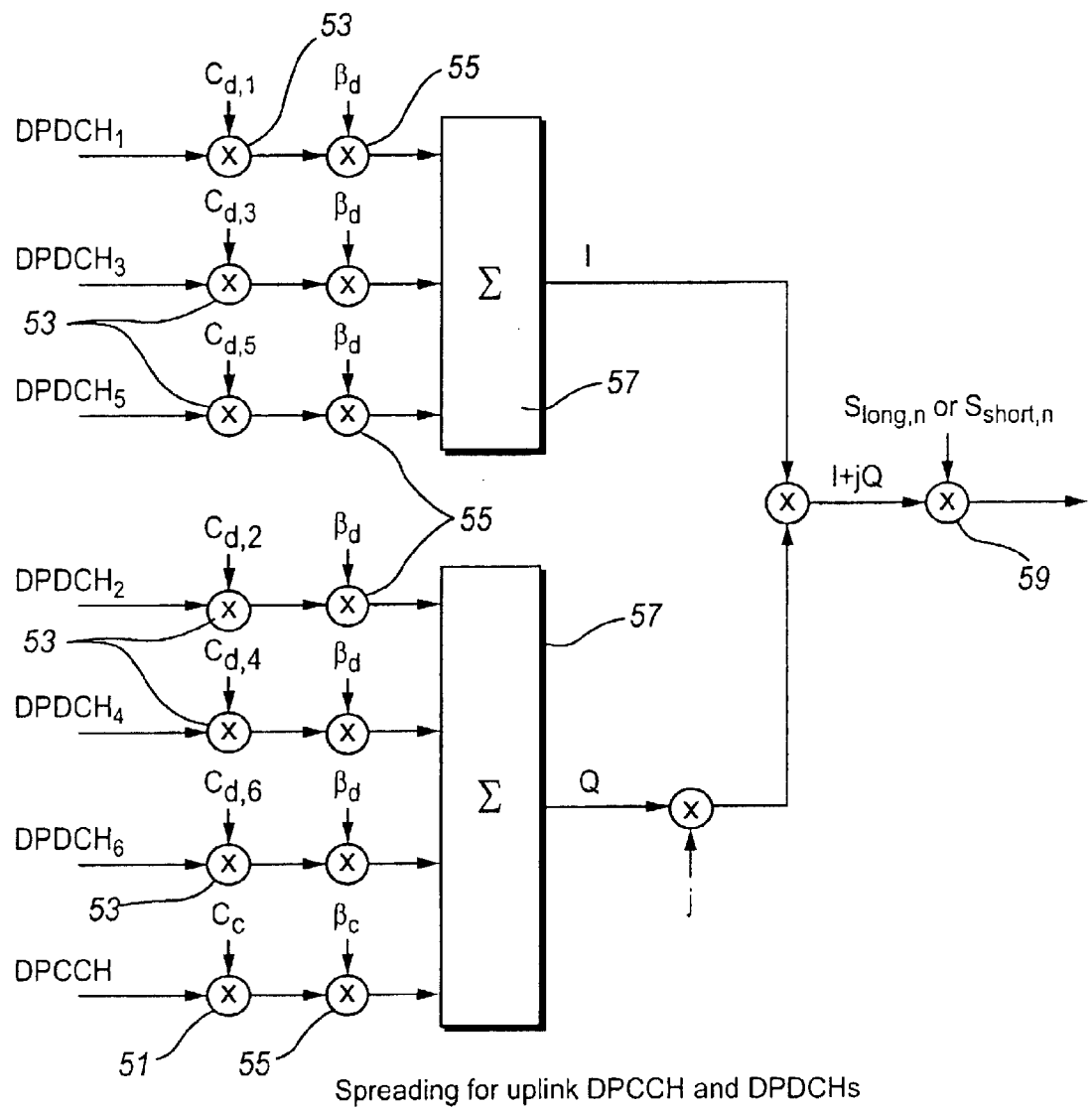
FIG. 14 is a block diagram illustrative of spreading for uplink dedicated physical channels such as DPCCH and DPDCHs.

Referring to FIG. 14, spreading is applied to the physical channels on the uplink. In certain preferred embodiments, Direct-Sequence Code Division Multiple Access (DS-CDMA) techniques may be used to spread information over about S MHz bandwidth, although other types of spreading may be used in other embodiments of this invention.

A channelization operation is performed as data symbols are transformed into a number of chips so as to increase the bandwidth of the signal. The number of chips per data symbol is the Spreading Factor (SF). Thereafter, a scrambling operation is performed where a scrambling code is applied to the spread signal. In channelization, data symbols on so-called I- and Q-branches are independently multiplied with an OVSF code. With the scrambling operation, the resultant signals on the I- and Q-branches are further multiplied by complex-valued scrambling code, where I and Q denote real and imaginary parts, respectively.

Referring more particularly to FIG. 14, uplink spreading of DPCCH and DPDCHs is illustrated. The binary DPCCH and DPDCHs to be spread are represented by real-valued sequences, i.e. the binary value "0" is mapped to the real value+1, while the binary value "1" is mapped to the real value−1. The DPCCH is spread to the chip rate by the channelization code $c_c$ at 51, while the n:th DPDCH called $DPDCH_n$ is spread to the chip rate by the channelization code $C_{d,n}$ at 53, e.g., via a spreading circuit. Each code is different. One DPCCH and up to six parallel DPDCHs can be transmitted simultaneously, i.e. 0≦n≦6, in different embodiments of this invention. As mentioned above, DPDCH and DPCCH may be spread using the same or different spreading factors in different embodiments of this invention.

After channelization, the real-valued spread signals are weighted at 55 by gain factors, $\beta_c$ for DPCCH and $\beta_d$ for all DPDCHs. At each given point in time, at least one of the values $\beta_c$ at and $\beta_c$ has the amplitude 1.0. The β-values may be quantized into 4 bit words.

Figure 15:
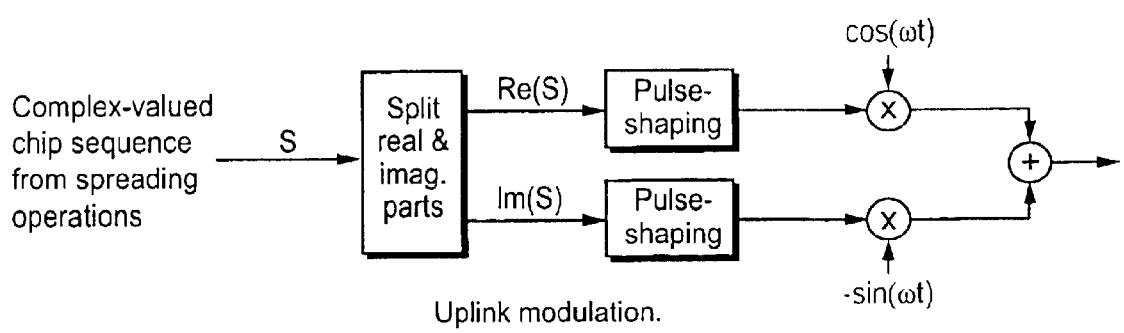
FIG. 15 is a block diagram illustrative of uplink modulation of the complex-valued chip sequence from the spreading process of FIG. 14.

After weighting 55, the stream of real-valued chips on the I- and Q-branches are summed 57 and treated as a complex-valued stream of chips. This complex-valued signal is then scrambled by the complex-valued scrambling code $S_{long,n}$ or $S_{short,n}$ at 59, depending on whether long or short scrambling codes are used. The scrambling code is aligned with the frames, i.e. the first scrambling chip corresponds to the beginning of a frame. In the uplink, at a modulating chip rate of, e.g., 3.84 Mcps, the complex-valued chip sequence generated by the spreading process in FIG. 14 may be QPSK or otherwise modulated as shown in FIG. 15.

After being spread and modulated, the uplink DHDCP and DHCCPs are transmitted from the MS to a BS or the like in certain embodiments of this invention. As is apparent from the above, in certain embodiments of this invention, a MS transmits a compressed mode composite signal to a BS where the TG in the DPDCH(s) is achieved by a combination of SF reduction and rate matching as described above, and the TG in the DPCCH is achieved solely by rate matching as described regarding FIGS. 7-10 and 12. In other embodiments of this invention, both the DPDCH and DPCCH may be transmitted from a MS to a BS in compressed mode via a composite signal where the TG in both is achieved by a combination of SF reduction and rate matching. In still further embodiments, both the DPDCH and DPCCH may be transmitted from a MS to a BS in compressed mode via a composite signal where the TG in both is achieved by rate matching, and wherein the TFCI bits are repeated in the control channel as in any of FIGS. 7-10 and 12.

Figure 19:
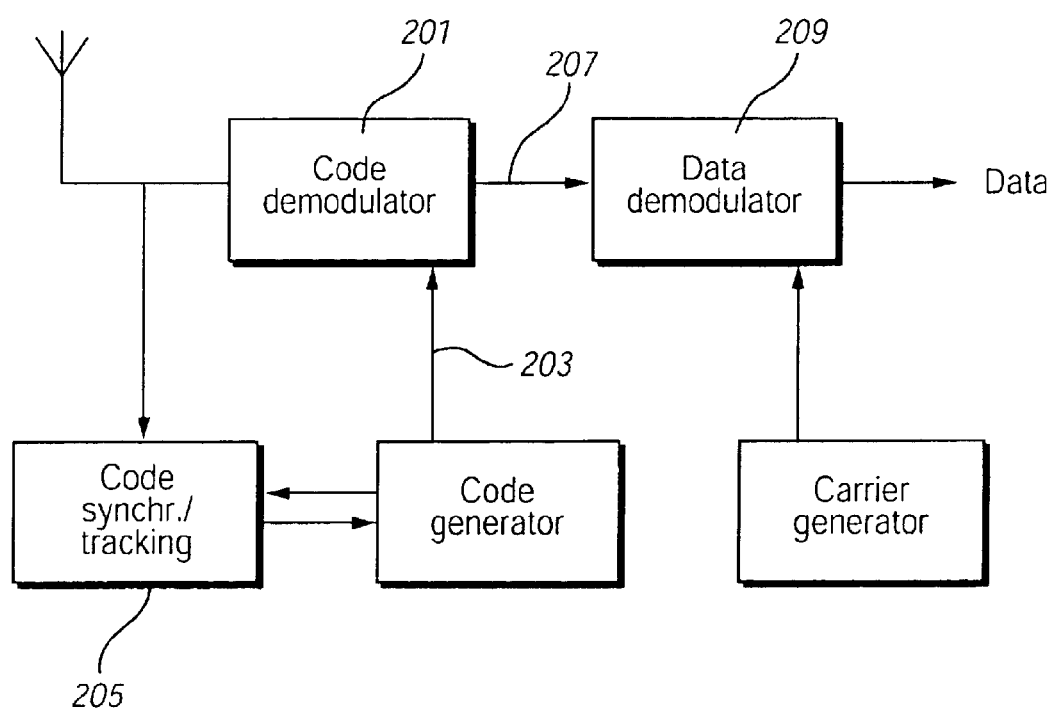
FIG. 19 is a block diagram of a receiver for receiving and despreading CDMA signals.

FIG. 19 illustrates an exemplary receiver for receiving any of the CDMA signals herein. For example, on an uplink when the signal is transmitted from a MS to a BS, the receiver is located at the BS. The receiver may use coherent demodulation 201 to despread the received CDMA signal, using a locally generated code sequence 203. The codes of the received signal and the locally generated codes 203 are synchronized by tracking/synchronizing device 205, with synchronization being accomplished at the beginning of signal reception and maintained until the whole signal has been received. After despreading by demodulator 201, a data modulated signal 207 results and after data demodulation by data demodulator 209 the original data can be recovered.

Figure 16:
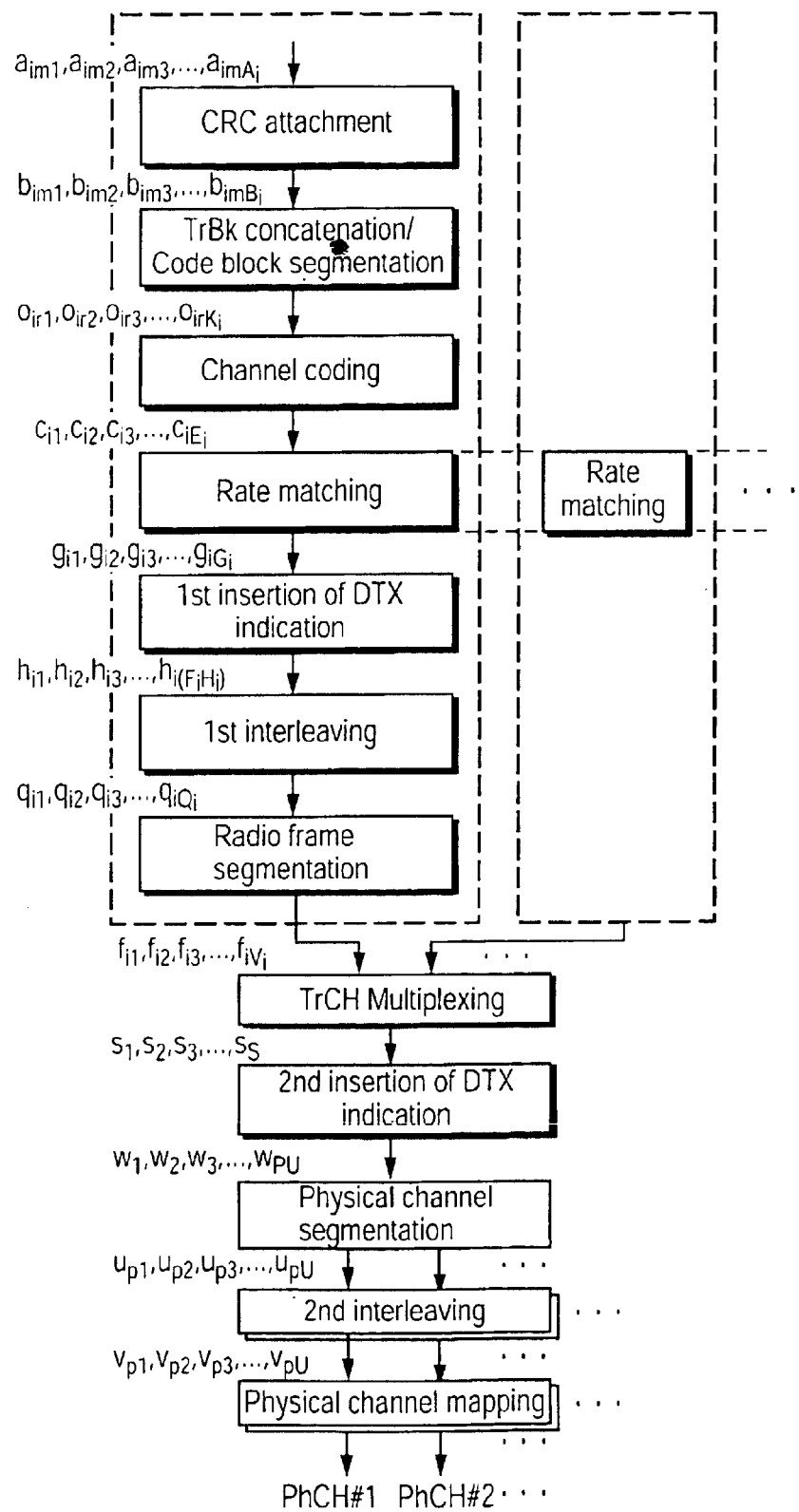
FIG. 16 is a flow chart/block diagram illustrating how downlink frames are formed.
Figure 17:
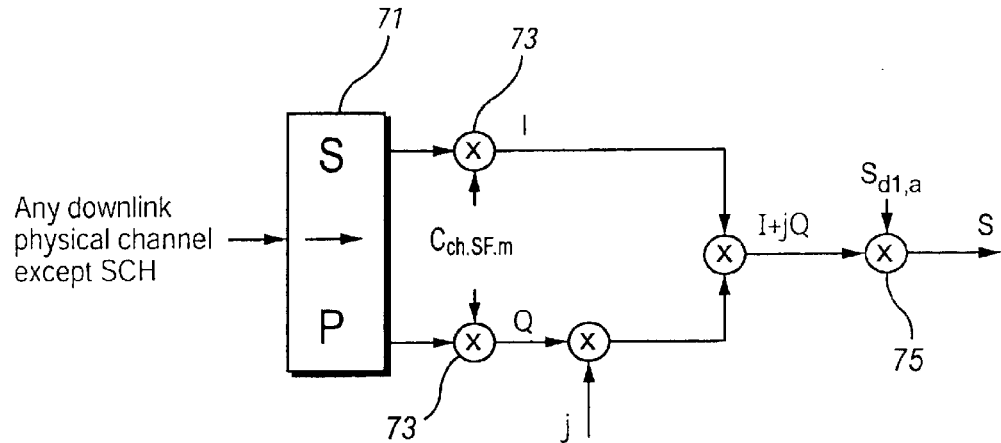
FIG. 17 is a block diagram illustrative of spreading for downlink channels from a BS to a MS.
Figure 18:
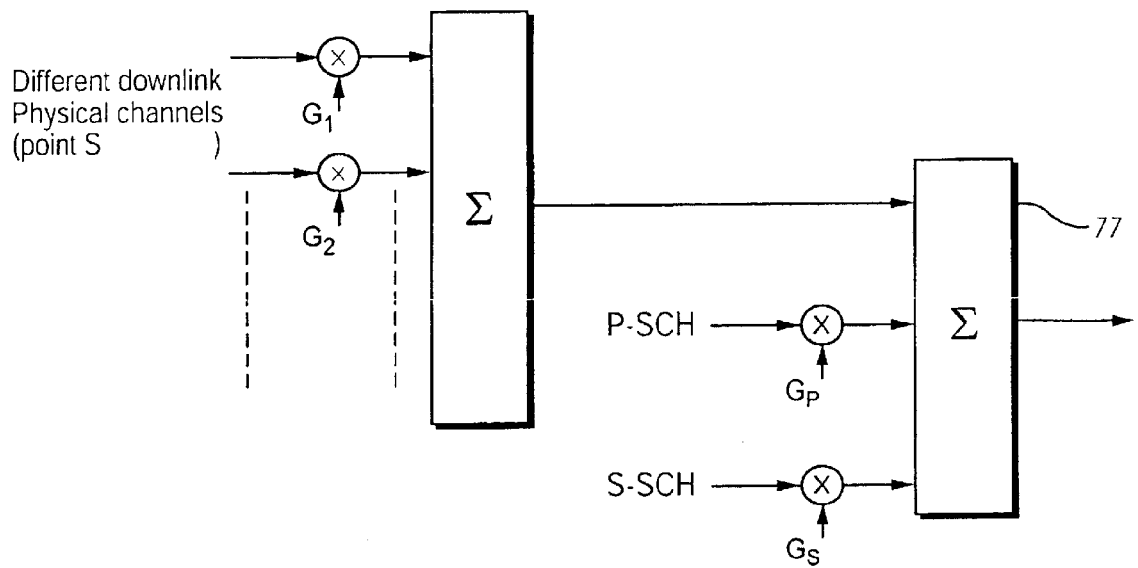
FIG. 18 is a block diagram illustrative of spreading and modulation for SCH and P-CCPCH output from FIG. 17.

As for the downlink, FIG. 16 illustrates certain steps taken, while FIGS. 17-18 illustrate the spreading operation for certain downlink physical channels. Referring more particularly to FIGS. 17-18, each pair; of two consecutive symbols is first serial-to-parallel converted and mapped to an I and Q branch at 71. The mapping is such that even and odd numbered symbols are mapped to the I and Q branches, respectively. The I and Q branches are then spread to the chip rate at 73 by the real-valued channelization code(s). The channelization codes are the same codes as used in the uplink, namely Orthogonal Variable Spreading Factor (OVSF) codes. The sequences of real-valued chips on the I and Q branch are then treated as a single complex-valued sequence of chips. This sequence of chips is scrambled (e.g., complex chip-wise multiplication) by a complex-valued scrambling code at 75.

FIG. 18 illustrates how different downlink channels are combined. Each complex-valued spread channel, corresponding to point S in FIG. 17, is separately weighted by a weight factor $G_i$. Optionally, certain complex-valued channels such as P-SCH and S-SCH, may be separately weighted by weight factors $G_p$ and $G_S$. All downlink physical channels are; then combined at 77 using complex addition.

In the downlink compressed mode, the TGL is often longer than necessary if simple SF reduction is used to form the TG. No pilot and/or TPC commands are sent during the TG, and a loss in performance may result. Thus, according to certain embodiments of this invention, such loss potential is minimized by transmitting pilot and TPC commands in all slots, not used for measurements. In other words, transmission of TPC, PL and/or TFCI should be active in as large a part of the frame as possible to minimize loss due to degraded power control performance. Thus, TPC, TFCI, and/or pilot bits may be transmitted in all slots not within the transmission gap (for both uplink and downlink). The following example illustrates how information may be transmitted in one part of a frame, and control information transmitted over a larger part of that frame (i.e., control information may be actively transmitted during time when there is a transmission gap in the information or data bits being transmitted). For example, assume that a required transmission gap is only four slots. Assuming a spreading factor reduction by a factor of two, information/data bits may be transmitted in 7.5 (same as 8) slots. However, control (e.g., TFCI, TPC) information may be transmitted in 11 slots of the frame (15−4=11).

Moreover, for downlink compressed mode (either via SF reduction; or puncturing), the slot format may be changed so that no TFCI bits are lost. The different slot formats in compressed mode do not match the exact number of TFCI bits for all possible TGLs. DTX (discontinuous transmission indicator) is therefore used if the number of TFCI fields exceeds the number of TFCI bits. The block of fields, where DTX is used, starts on the first field after the gap. In the downlink, DTX is thus used to fill up the radio frame with bits. This applicable to uplink and downlink.

Figure 11:
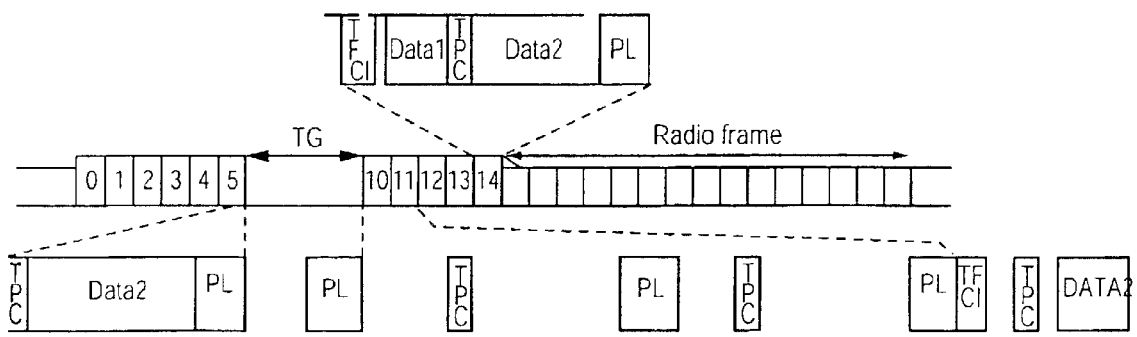
FIG. 11 illustrates a downlink frame structure, with DTX bits added thereto in illustrated gaps.

For example, half of the last TFCI field (see slot 14 in FIG. 11) is filled with DTX bits as shown in FIG. 11 (empty fields indicate DTX bits). Such a DTX corresponds to the half slot obtained when reducing the SF by a factor of two.

If there are fewer TFCI fields after the gap than DTX bits, the last fields before of the gap are also filled with DTX. The number of bits available in the TFCI fields of one compressed radio frame is D and the number of bits in the TFCI field in a slot is $N_{TFCI}$. Again, bit E is the first bit to be repeated, $E=N_{first}N_{TFCI}$. If $N_{last} \neq 14$, then E corresponds to the number of the first TFCI bit in the slot directly after the TG. The total number of TFCI bits to be transmitted is $N_{tot}$. If $SF \geq 128$ then $N_{tot}=32$, else $N_{tot}=128$. The following relations then define the mapping:

$d_k = b_{(k \bmod 32)}$ where $k=0, 1, 2, \ldots,$ min $(E, N_{tot})-1$ and, if $E<N_{tot}$, $d_{k+D-Ntot} = b_{(k \bmod 32)}$ where $k=E, \ldots, N_{tot}-1$.

DTX bits are sent on $d_k$ where $k=$min $(E, N_{tot}), \ldots,$ min $(E, N_{tot})+D-N_{tot}-1$.

While the invention has been described in connection with what is presently considered to be the most practical and preferred embodiment, it is to be understood that the invention is not to be limited to the disclosed embodiment, but to the contrary is intended to cover various modifications and equivalent arrangements, and embodiments included within the spirit and scope of the appended claims.

What is claimed is:

1. A method of transmitting a code division multiple access (CDMA) frame in a cellular communications network, the method comprising:

providing the CDMA frame so as to include a plurality of slots and at least a portion of a transmission gap (TG);

defining the transmission gap using both a reduced spreading factor (SF) and increased redundancy of information bits to be transmitted;

transmitting the frame, including the plurality of slots, on a channel;

wherein the frame is transmitted on one of an uplink and a downlink;

spreading the information bits to be transmitted on a higher rate data signature sequence to produce a coded information signal; and intermittently transmitting coded information signals in a compressed mode using the reduced spreading factor with a reduced spreading ratio, wherein a frame transmitted in the compressed mode includes a first part having a time duration of less than a duration of the entire frame and a second part also having a time duration of less than the duration of the entire frame.

2. The method of claim 1, wherein said transmitting step comprises transmitting the frame on an uplink from a mobile station (MS) to a base station (BS) in the network.

3. The method of claim 2, wherein the channel is a dedicated physical data channel.

4. The method of claim 2, wherein the transmission gap is located between first and second slots in the frame.

5. The method of claim 2, further comprising reducing the spreading factor by a factor of two, and increasing the redundancy of information bits to be transmitted so that the transmission gap length is less than a length of half the frame.

6. The method of claim 5, wherein the frame is a radio frame comprising fifteen time slots.

7. A method of transmitting spread spectrum frames, the method comprising:

providing data to be transmitted on a channel, spreading a first portion of the data on a higher rate sequence using a first spreading factor to produce a first coded information signal including a first frame including a plurality of slots, transmitting the first frame, including all slots thereof, on the channel;

forming a compressed mode frame by spreading a second portion of the data on a higher rate sequence using a second spreading factor to produce a second coded information signal including a second frame, wherein the second spreading factor is less than the first spreading factor so that the second frame includes at least a portion of a transmission gap having a length less than half the number of total slots in the second frame;

defining a length of the transmission gap using both increased redundancy of bits on a transport channel and the second spreading factor so that the transmission gap has a length less than a length of half the second frame; and transmitting the second frame on the channel.

8. A compressed mode spread spectrum frame to be transmitted on a channel, the frame comprising:

a plurality of time slots;

a transmission gap provided between first and second ones of the time slots in the frame; and wherein a length of the transmission gap is less than half of a time length of the entire frame, with the transmission gap length being defined at least in part by using a first spreading factor reduced by a factor of two relative to a second spreading factor which also may b used on the channel, and increased redundancy of bits to be transmitted, and the frame is either an uplink frame or a downlink frame.

* * * * *